United States Patent
Massand (10) Patent No.: US 9,047,258 B2
(45) Date of Patent: Jun. 2, 2015

(54) SYSTEMS AND METHODS FOR THE COMPARISON OF SELECTED TEXT

(75) Inventor: Deepak Massand, McLeansville, NC (US)

(73) Assignee: Litera Technologies, LLC, McLeansville, NC (US)

( * ) Notice: Subject to any disclaimer, the term of this patent is extended or adjusted under 35 U.S.C. 154(b) by 267 days.

(21) Appl. No.: 13/223,861

(22) Filed: Sep. 1, 2011

(65) Prior Publication Data

US 2013/0060799 A1    Mar. 7, 2013

(51) Int. Cl.
*G06F 17/30*     (2006.01)
*G06F 17/22*     (2006.01)

(52) U.S. Cl.
CPC ................................. *G06F 17/2211* (2013.01)

(58) Field of Classification Search
CPC ..... G06F 7/02; G06F 17/30; G06F 17/30985; G06F 2207/025
USPC ................. 707/758; 715/229; 704/4
See application file for complete search history.

(56) References Cited

U.S. PATENT DOCUMENTS

| | | | | |
|---|---|---|---|---|
| 6,236,993 | B1* | 5/2001 | Fanberg | 707/690 |
| 7,440,304 | B1* | 10/2008 | Raj | 365/49.1 |
| 2003/0101163 | A1* | 5/2003 | Lui et al. | 707/707 |
| 2004/0158799 | A1* | 8/2004 | Breuel | 715/513 |
| 2005/0010863 | A1* | 1/2005 | Zernik | 715/511 |
| 2005/0188307 | A1* | 8/2005 | Bailey et al. | 715/531 |
| 2008/0023282 | A1* | 1/2008 | Duncan | 190/1 |
| 2008/0034282 | A1* | 2/2008 | Zernik | 715/229 |
| 2008/0071781 | A1* | 3/2008 | Ninan et al. | 707/707 |
| 2008/0244378 | A1* | 10/2008 | Chen et al. | 715/226 |
| 2009/0055416 | A1* | 2/2009 | Agarwal et al. | 707/707 |
| 2011/0022960 | A1* | 1/2011 | Glover | 715/732 |

* cited by examiner

*Primary Examiner* — Robert Beausoliel, Jr.
*Assistant Examiner* — Alexandria Bromell
(74) *Attorney, Agent, or Firm* — Finnegan, Henderson, Farabow, Garrett & Dunner, LLP (57) ABSTRACT

Systems and methods are disclosed for comparing selections of text to show differences between the two selections. The text may be selected from the same source or from two different sources. In one implementation, a system receives a first selection of text for comparison and places the selection in a first buffer. The system receives a second selection of text for comparison and places the second selection in a second buffer. The system compares the first buffer and the second buffer to determine differences and displays the differences. In some embodiments, the system may allow a user to choose two buffers from among a plurality of buffers for comparison.

20 Claims, 7 Drawing Sheets

From: John Smith
Sent: Friday, June 24, 2011
To: Jane Doe
Subject: Re: Please Revise Hi Jane, here is the revised text:

310

2.8 AAA Reseller Maintenance Revenue. To the extent that there are already end users who have maintenance contracts with a AAA Reseller and the AAA Reseller receives any revenue for the provision of maintenance and support to AAA's Customers for the AAA Software during the two year period set forth in Section 2.1, then BBB has agreed to accept a royalty of xx% for any revenue the AAA Reseller earns for providing maintenance and support under existing contracts for AAA software during this period.

Best,
John

---

From: Jane Doe
Sent: Tuesday, June 21, 2011
To: John Smith
Subject: Please Revise Hi John, please revise this text to suit your needs:

305

2.7 AAA Maintenance Revenue. To the extent that AAA receives any revenue for the provision of maintenance and support to AAA's Customers for the AAA software during the two year period set forth in Section 2.1, AAA, if they choose to provide maintenance and support, will pay BBB xx% of all such revenues in consideration for BBB permitting the continuance of such activities.

Thanks,
Jane

From: John Smith
Sent: Friday, June 24, 2011
To: Jane Doe
Subject: Re: Please Revise

Hi Jane, here is the revised text:

2.8 AAA Reseller Maintenance Revenue. To the extent that there are already end users who have maintenance contracts with a AAA Reseller and the AAA Reseller receives any revenue for the provision of maintenance and support to AAA's Customers for the AAA Software during the two year period set forth in Section 2.1, then BBB has agreed to accept a royalty of xx% for any revenue the AAA Reseller earns for providing maintenance and support under existing contracts for AAA software during this period.

Best,
John

— 310
— 400

| Cut |
| Copy |
| Paste |
|  |
| Font |
| Paragraph... |
| Bullets |
| Numbering |
| Styles |
|  |
| Add to Compare |
| Compare Selected |
| Clear Selected |

— 405

From: Jane Doe
Sent: Tuesday, June 21, 2011
To: John Smith
Subject: Please Revise

Hi John, please revise this text to suit your needs:

2.7 AAA Maintenance Revenue. To the extent that AAA receives any revenue for the provision of maintenance and support to AAA's Customers for the AAA software during the two year period set forth in Section 2.1, AAA, if they choose to provide maintenance and support, will pay BBB xx% of all such revenues in consideration for BBB permitting the continuation of such activities.

Thanks,
Jane

2.87 AAA Reseller Maintenance Revenue. ~~To the extent that there are already end users who have maintenance contracts with a AAA Reseller and the AAA Reseller~~ AAA receives any revenue for the provision of maintenance and support to AAA's Customers for the AAA ~~Software~~software during the two year period set forth in Section 2.1, ~~then BBB has agreed~~AAA, if they choose to ~~accept a royalty of xx% for any revenue the AAA Reseller earns for providing~~provide maintenance and support ~~under existing contracts for AAA software during this period~~will pay BBB xx% of all such revenues in consideration for BBB permitting the continuance of such activities.

605

Cut
Copy
Paste
___
Font
Paragraph …
Bullets
Numbering
Styles
___
Add to Compare
Compare Selected
Clear Selected

SYSTEMS AND METHODS FOR THE COMPARISON OF SELECTED TEXT

TECHNICAL FIELD

This disclosure generally relates to the comparison of text selections and more particularly, to methods and systems for comparing selected text of a single file or of two files of differing types, and other non-conventional text comparison sources.

BACKGROUND

Conventional document comparison programs, such as Workshare™ Professional or Deltaview, SoftInterface® Diff Doc™, DocsCorp compareDocs, and Esquire Innovations iRedline, compare differences between two documents (e.g., word processing documents, spreadsheet documents, presentation documents, etc.), a task formerly reserved solely for humans. These programs identify and ascertain differences from the entirety of an original (first) and modified (second) document and display those differences in a third document, commonly referred to as a redline document.

These conventional document comparison programs fail to offer the ability to compare text from within the same document (such as an email), to compare text from different types of documents (such as a word document and a power point presentation), or to compare the text of two web pages or two email messages. Rather, when using the conventional programs, a reader must perform the cumbersome steps of selecting and copying the text from the source file, pasting the selected text into a new document, and repeating the copying and pasting for the second source so that the conventional program can then run the comparison process. This method is inefficient, burdensome, and a potential source of errors.

SUMMARY

Disclosed embodiments provide computer-based file comparison systems and methods that enable the comparison of selections of text, from within a single file or from various sources, without the need for a copy and paste operation by the user. Consistent with disclosed embodiments, a system is provided for comparing text. In one aspect, the system includes a processor and a memory. The memory may include instructions that cause the processor to receive a first text selection and a second text selection for comparison. The memory may further include instructions that cause the processor to place the first text selection in a first buffer and the second text selection in a second buffer. The memory may further include instructions that cause the processor to compare the first text selection of the first buffer with the second text selection of the second buffer to determine differences, and may generate data used to display the differences, if any. The first text selection and the second text selection may be from the same source or from different sources. The sources may also be of different file types.

Consistent with disclosed embodiments, a method is provided for comparing selections of text. In one aspect, the method includes receiving a first selection of text and placing the first selection of text into a first buffer. The method may further include receiving a second selection of text and placing the second selection of text into a second buffer. The method may further determine differences between the first buffer and the second buffer and generate data used to display the differences.

Consistent with other disclosed embodiments, tangible computer-readable storage media may store program instructions that are executable by a processor to implement one or more of the methods disclosed herein.

The foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and together with the description, serve to explain disclosed principles of comparing text selections. In the drawings.

DESCRIPTION OF THE EMBODIMENTS

The disclosed embodiments may enable a user to more easily compare selected text from within the same source file or from different source files. Text may include any type of data stored and displayed by one or more computers, including binary computer code, ASCII characters, glyphs, logograms such as han characters, etc. In one aspect, a user or a computer process executing software may simply select text from the two files and facilitate a comparison through selection of a comparison operator. Thus, disclosed embodiments eliminate the cumbersome steps that a user must currently perform, such as having to select, copy, and paste each text selection into a new word processing document before performing a comparison. Disclosed embodiments also allow comparison of text from various sources, such as word processing documents, spreadsheets, PDF documents, presentations, emails, web pages, text files, etc.

Reference will now be made in detail to exemplary embodiments, examples of which are illustrated in the accompanying drawings. Wherever convenient, the same reference numbers will be used throughout the drawings to refer to the same or like parts.

Figure 1:
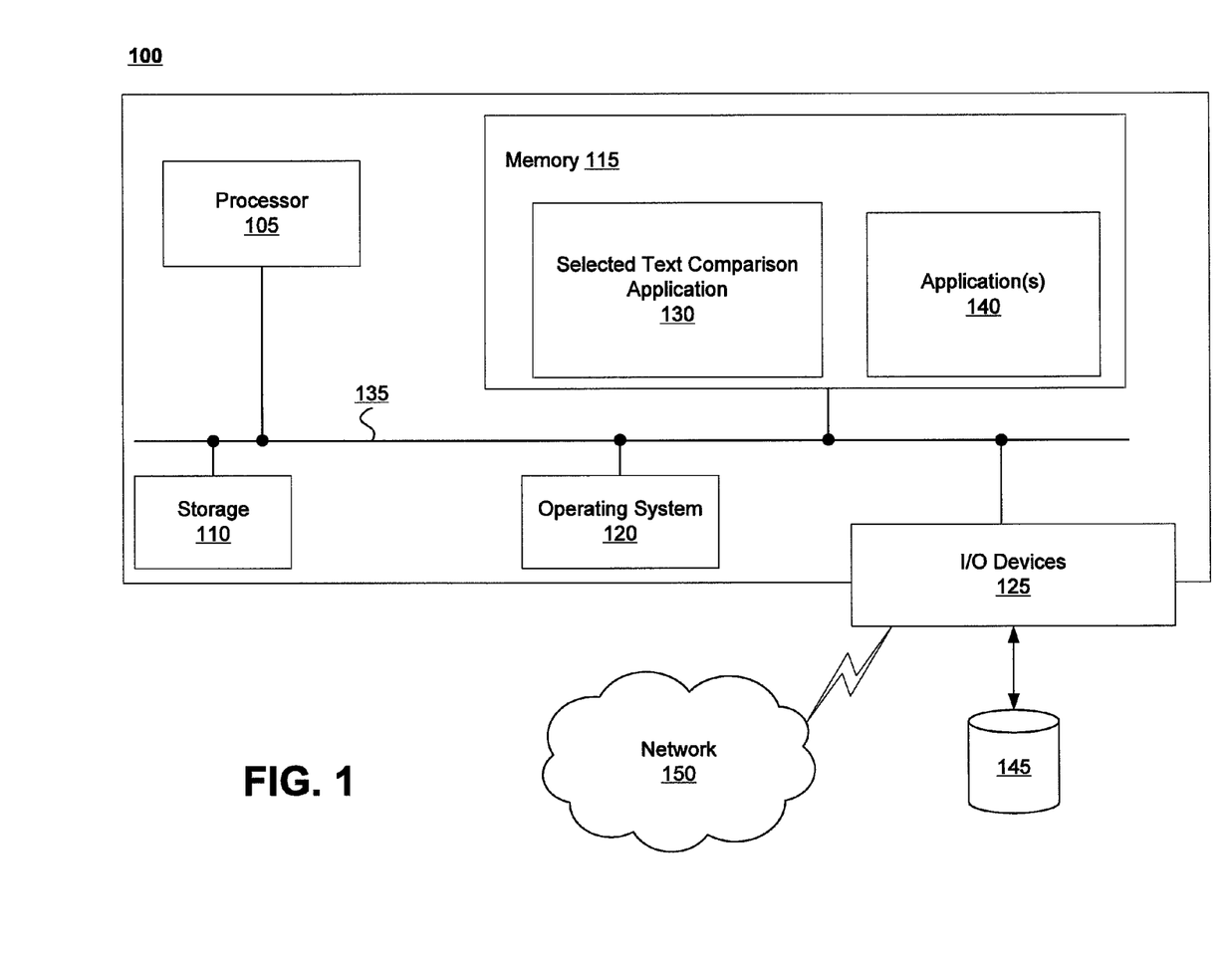
FIG. 1 is a diagram of exemplary system components that may be used to implement disclosed embodiments.

FIG. 1 is a diagram of an exemplary system 100 that may be used to implement one or more disclosed embodiments. The components and arrangement of system 100 may vary, and are not limited to that illustrated in FIG. 1. In accordance with certain disclosed embodiments, computer system 100 may include a processor 105, storage 110, memory 115, operating system 120, input/output (I/O) devices 125, and bus 135. In one embodiment, memory 115 may include selected text comparison application 130 and other applications 140. In one example, selected text comparison application 130 may be software and applications 140 may be other software. In one embodiment, selected text comparison application 130 may be a stand-alone application or may be incorporated into one or more other applications 140. Selected text comparison application 130 may reside in memory 115, and may be loaded from storage 110 or from other external tangible storage medium (not shown) through I/O devices 125. Instructions in selected text comparison application 130 may be executed by one or more processors, such as processor 105, to perform features consistent with one or more disclosed embodiments.

Computer system 100 may be a general purpose or notebook computer, a mobile device with computing ability, a tablet computer, a smart phone, a server, a mainframe computer, or any other type of computer or combination of computers and/or affiliated components. Computer system 100 may communicate with a network 150 through I/O devices 125. For example, computer system 100 may establish a communication link with network 150, such as through a wireless or wired LAN, a WAN, or other suitable connection that enables computer system 100 to send and receive information, as described herein. Computer system 100 may be a standalone system or may be part of a subsystem, which may, in turn, be part of a larger system, such as a networked desktop emulator. Computer system 100 may be accessible to a user locally, or may be available to a user over the Internet or other type of network.

Processor 105 may be one or more known or later created processing devices, such as a microprocessor from the Pentium™ family manufactured by Intel™ or the Turion™ family manufactured by AMD™. Memory 115 may be one or more storage devices configured to store information used by processor 105 to perform certain functions related to disclosed embodiments. Storage 110 may be a volatile or nonvolatile, magnetic, semiconductor, tape, optical, removable, nonremovable, or other type of storage device or tangible computer-readable medium.

In one embodiment, memory 115 may include selected text comparison application 130 that, when executed by a processor, such as processor 105, may enable the selection of text for comparison, the comparison of the selected text, and the generation of data used to display the results of the comparison. Selected text comparison application 130 may be part of an application that compares files, may be a stand-alone application or applet, or may be run as a sub program (i.e. a child application) of application 140, such as a word processing application or an Internet browser application, which may provide for editing or viewing of files. Memory 115 may also include an integrative support program that links the applications and allows them to use a common database, provides a common user interface, performs basic bookkeeping tasks, (such as storing the user's input, etc.), and provides user guidance and help. Memory 115 may also include other programs that perform other functions and processes, such as programs that provide communication support, Internet access, etc.

Methods, systems, and articles of manufacture consistent with disclosed embodiments are not limited to separate programs or computers configured to perform dedicated tasks. For example, memory 115 may be configured with selected text comparison application 130, which performs one or more functions when executed by processor 105. Alternatively, memory 115 may include multiple programs that collectively perform one or more functions of selected text comparison application 130. Moreover, processor 105 may execute one or more programs located remotely from system 100. For example, system 100 may access one or more remote programs that, when executed, perform one or more functions of selected text comparison application 130.

Memory 115 may be also be configured with operating system 120 that performs known operating system functions when executed by system 100. By way of example, operating system 120 may include Microsoft Windows™, Unix™, Linux™, Apple™ Computers type operating systems, Personal Digital Assistant (PDA) type operating systems, such as Microsoft CE™, or other types of operating systems. Accordingly, embodiments of the disclosed invention will operate and function with computer systems running any type of operating system.

I/O devices 125 may comprise one or more input devices and one or more output devices that allow data to be received and/or transmitted by system 100. For example, I/O devices 125 may include one or more input devices, such as a keyboard, a touch screen, a mouse, and the like, that enable system 100 to receive data from a user, such as selections of text, for comparison. Further, system 100 may include I/O devices 125 that communicate with one or more output devices, such as a display screen, a CRT monitor, an LCD monitor, a plasma display, a printer, and speaker devices, that enable system 100 to present data, such as a comparison output file, to a user. I/O devices 125 may also include one or more digital and/or analog communication input/output devices that allow system 100 to communicate with other machines and devices, including other machines and devices connected to network 150. The configuration and number of input and/or output devices incorporated in I/O devices 125 may vary as appropriate for certain embodiments.

Computer system 100 may also be communicatively connected to one or more databases 145 locally or through network 150. Databases 145 may store information and may be accessed and/or managed through system 100. By way of example, databases 145 may be Microsoft SQL databases, SharePoint databases, Oracle™ databases, Sybase™ databases, or other databases. Databases 145 may include, for example, data and information related to settings used by selected text comparison application 130. Systems and methods of disclosed embodiments, however, are not limited to separate databases or even to the use of a database.

Figure 2:
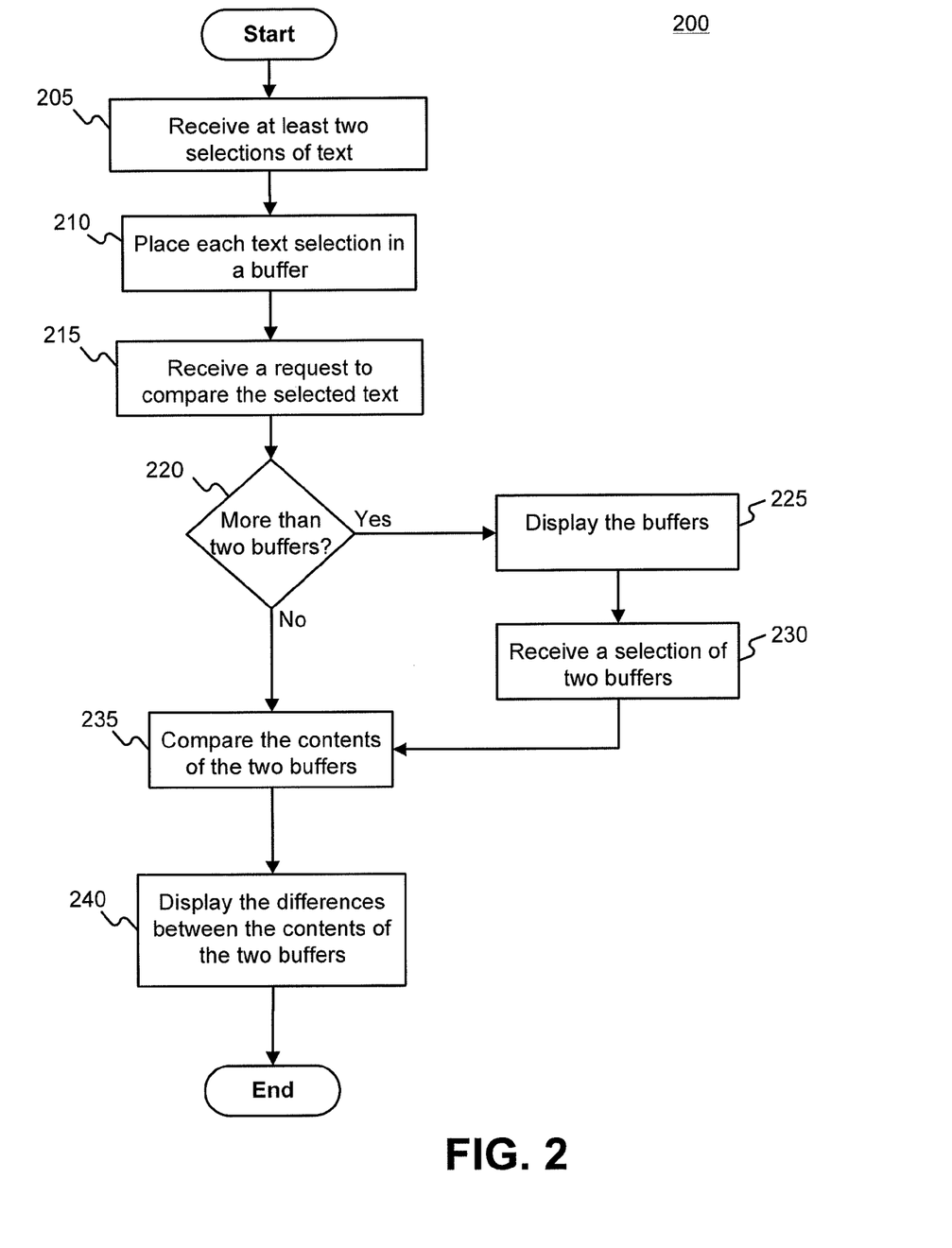
FIG. 2 is a flow diagram illustrating an exemplary text selection and comparison process, consistent with disclosed embodiments.

FIG. 2 is a flow diagram illustrating an exemplary text selection and comparison process 200, consistent with disclosed embodiments. In certain embodiments, process 200 may be performed by selected text comparison application 130 when executed by processor, such as processor 105. Process 200 may be used to identify text for comparison, to store the identified text in a buffer, to allow a user to choose two text selections stored in the buffers for comparison, and to initiate a comparison upon the selected text.

In Step 205, selected text comparison application 130 may receive at least two selections of text. The text may be selected from any type of file, such as a document, a spreadsheet, a text file, an image, a database, a temporary buffer, a web-page, an email, a PDF file, or any other type of file or structure used to store text. The source of the text selection may include any data output to an output device (e.g., a screen) of computer system 100, or the source may be a file accessible by system 100. A text selection may include a portion or all of the full text contained in the file.

In one embodiment, a user may select the text using any known method of text selection, including but not limited to, placing a cursor at the beginning of the text, pressing and holding a mouse button, dragging the cursor to the end of the text, and releasing the mouse button. Alternatively, a user may select text using other mechanisms, such as through voice commands, menu selections, touch screen selections, etc. Selected text comparison application 130 may then receive an indication to initiate a comparison operation. In one embodiment, selected text comparison application 130 may receive an indication that a user desires to use the selected text in a comparison operation through an interface. In some embodiments, the interface may be a menu option that appears when the user completes the selection of text, such as when the user releases a mouse button or clicks on the selected text. In other embodiments, the interface may be an option in a parent application. Selected text comparison application 130 may receive the text selection through the interface.

The source from which a user selects text may be the contents of a file displayed on an output device of system 100, the contents of a file located on a system accessible to system 100 over network 150, or a combination of these.

In Step 210, selected text comparison application 130 may create a temporary buffer to hold each text selection received from the user and place the selected text in the buffer. A temporary buffer may be any type of temporary computer storage, including a file or a memory array, used to store the selected text. The clipboard feature used in the Microsoft Windows™ operating system is an example of a temporary buffer. In some embodiments, selected text comparison application 130 may track information about each buffer so that, for example, selected text comparison application 130 can display the source of the text within the buffer and/or the time that the text selection was received. The buffers created by selected text comparison application 130 may continue to be available to the user for comparison until they are deleted. In Step 215, selected text comparison application 130 may receive a request to initiate a comparison of the text selections. The request may be initiated by a user or by a computer process in an automated fashion.

In Step 220, selected text comparison application 130 may determine whether more than two buffers with selected text exist. If only two buffers exist (Step 220, No), selected text comparison application 130 may begin the comparison of the contents of the two buffers in Step 230. However, if more than two buffers exist (Step 220, Yes) then, in Step 225, selected text comparison application 130 may create a display of the buffers and allow the user to select two text selections associated with two buffers for comparison. For example, selected text comparison application 130 may create an interface used to display the available text selections (buffers) and allow a user to choose two. In some embodiments, the interface may include a portion of the text of each buffer, the source of the text contained in the buffer, the time the text was selected, etc.

Although FIG. 2 describes a process for selecting two buffers, disclosed embodiments may include selection of more than two buffers when text selection comparison application 130 is capable of comparing more than two input files. For example, in such embodiments at step 220, selected text comparison application 130 may determine whether more than three buffers exist. In other such embodiments, selected text comparison application 130 may allow the user to choose whether to compare two files or three files when more than three buffers exist.

In Step 230, selected text comparison application 130 may receive a selection of two of the buffers. In one embodiment, a user may select a buffer by clicking on a representation of the buffer, checking a box or a radio button next to a representation of the buffer, or through any other method that enables selection by a user of data displayed on an output device.

In Step 235, selected text comparison application 130 may compare the selected text associated with the two buffers. In one aspect, computer system 100 (or any other computer system or processor) may execute a file comparison process to compare the text of the two buffers. The file comparison process may be part of selected text comparison application 130, part of application 140, or a process located remotely from system 100. For example, in some embodiments, selected text comparison application 130 may send the text of the two selected buffers to a remote comparison process located, for example, on a server, and may receive the results of the comparison operation from the server. In other embodiments, selected text comparison application 130 may perform the comparison and generate the results of the comparison operation.

In Step 240 selected text comparison application 130 may generate information that allows a user to view the differences between the two text selections (i.e. the contents of the two buffers). In one embodiment, the differences may be displayed such that text in the first selection but not the second selection shows as deleted and text in the second selection but not in the first selection shows as inserted. The manner in which differences in the text selections is detected can vary and is not limited to the one example disclosed. Process 200 may then end, having created information used to show differences in two selections of text.

An example of an exemplary text selection and comparison process consistent with disclosed embodiments is explained in connection with FIGS. 3 through 7. In this example, a user selects two portions of text from within the same file for comparison. One of ordinary skill in the art will realize, however, that the selected text may come from two different files or two different types of files. For example, the text selections may reside in a web page and an email, two different web pages, from the same web page, from two email files, from a word processing document and an email, etc. Accordingly, disclosed embodiments are not limited to the example of text selection from a single email message, as discussed below.

Figure 3:
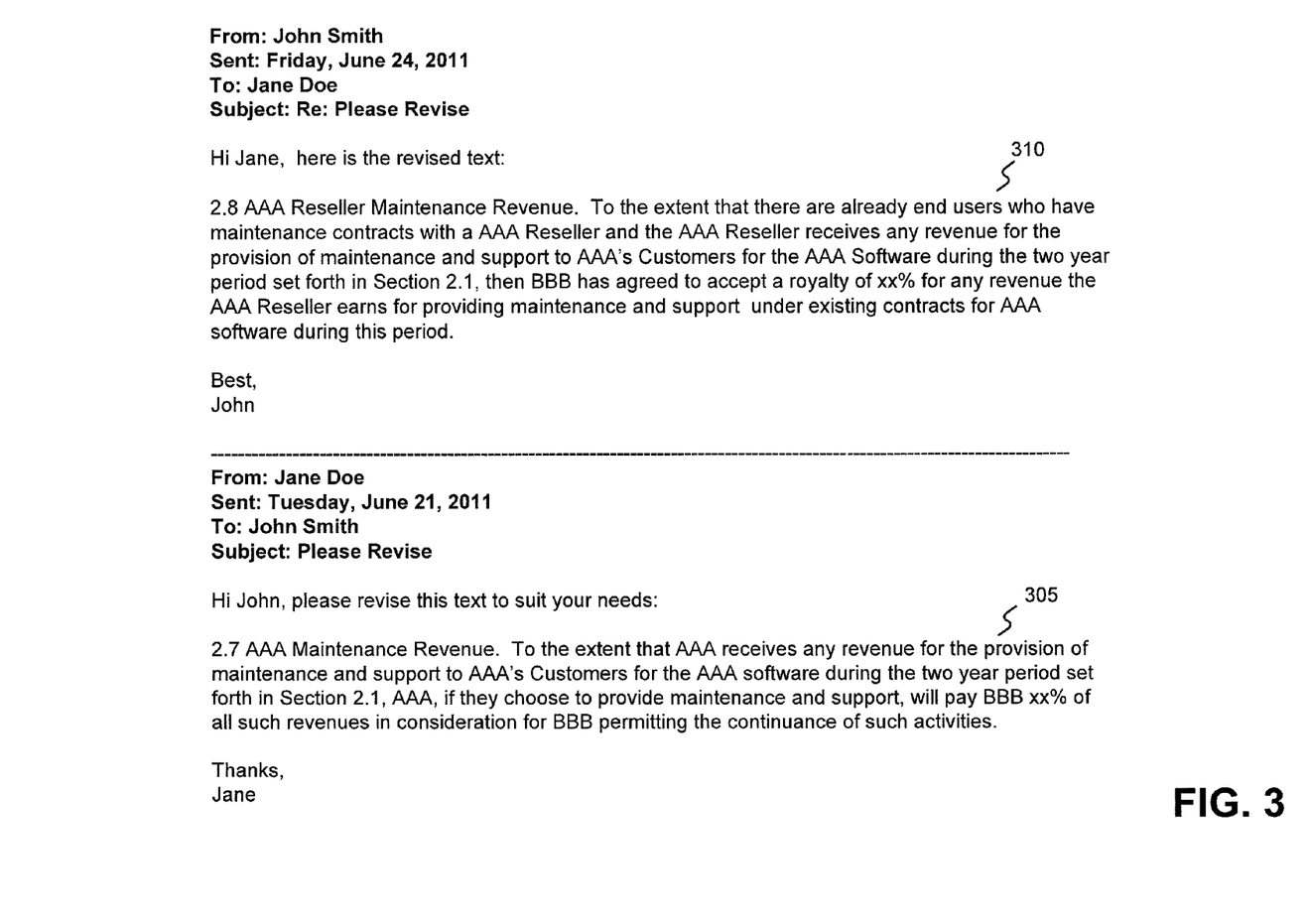
FIG. 3 is an example of an email chain, consistent with disclosed embodiments.
Figure 4:
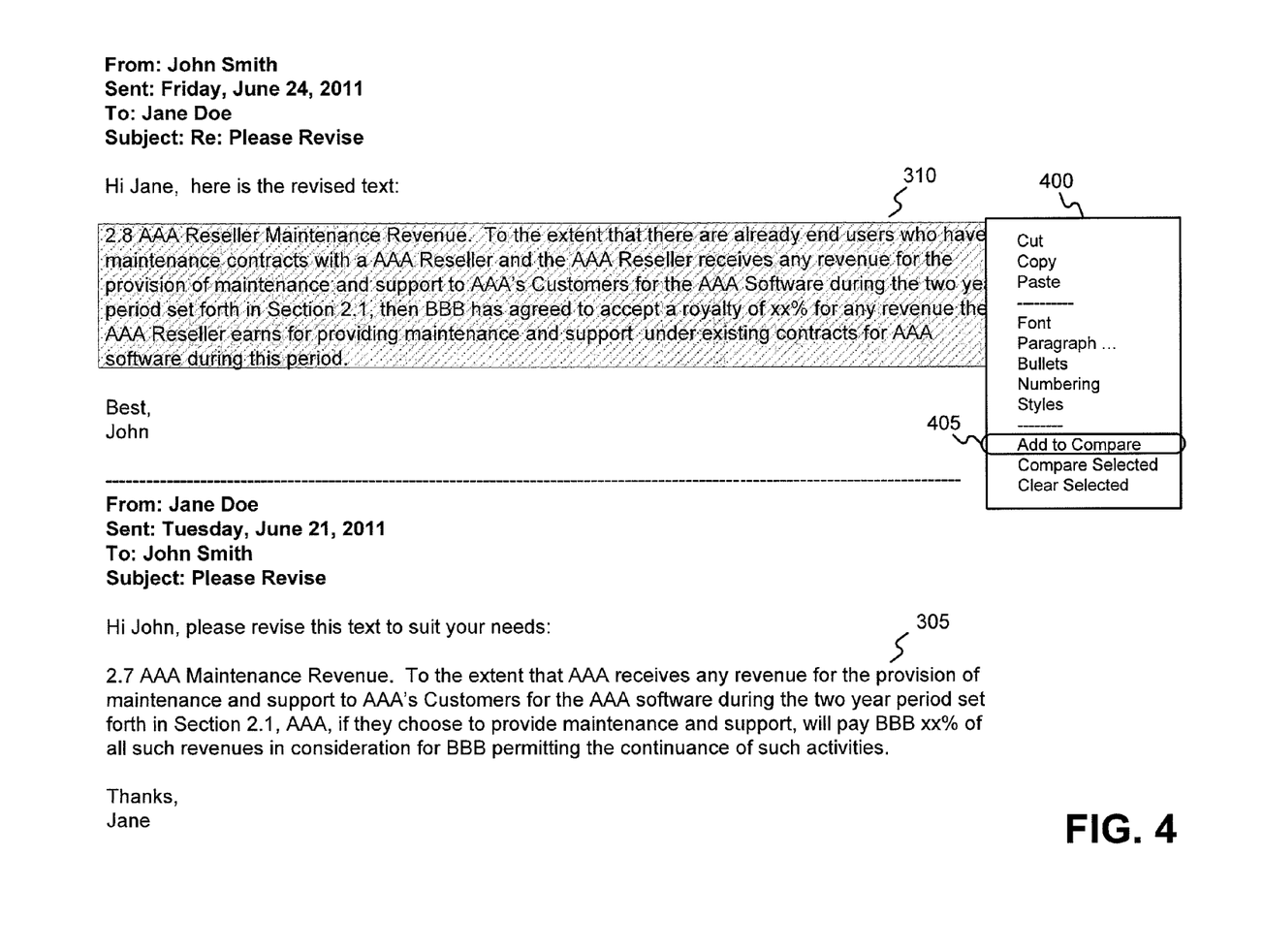
FIGS. 4 and 5 are exemplary text selection interfaces used to select text for comparison, consistent with disclosed embodiments.

In the disclosed example, a user may view an email chain displayed by system 100, as shown in FIG. 3. The user may have sent an original message 305 and received reply message 310. Reply message 310 may contain edits to original message 305, but the revisions are not readily apparent to the user. In order to easily determine what modifications have been made to reply message 310, the user may select all or part of the text of reply message 310, as shown in FIG. 4. For example, the user may click on the text "2.8," holding the left-mouse-button down and dragging the cursor to the end of the text at "period." The user may then release the left-mouse-button, causing the text to be highlighted or otherwise marked as selected. With the text selected, the user may right-click on the selected text using the right-mouse-button. In one embodiment, this may cause selected text comparison application 130 to display a menu, such as interface 400. The user may then select "Add to Compare" option 405 from interface 400. After receiving the selection of option 405, selected text comparison application 130 may cause the selected text of reply message 310 to be copied to a first buffer. As discussed above, the first buffer may be a temporary storage area including the selected text of reply message 310. In some embodiments, selected text comparison application 130 may also store the time that the first buffer was created and additional details about the source of the contents of the first buffer, such as the subject line of the email message, the author of the email message, etc. In some embodiments, selected text comparison application 130 may remove interface 400 after receiving the selection of option 405 from interface 400.

Figure 5:
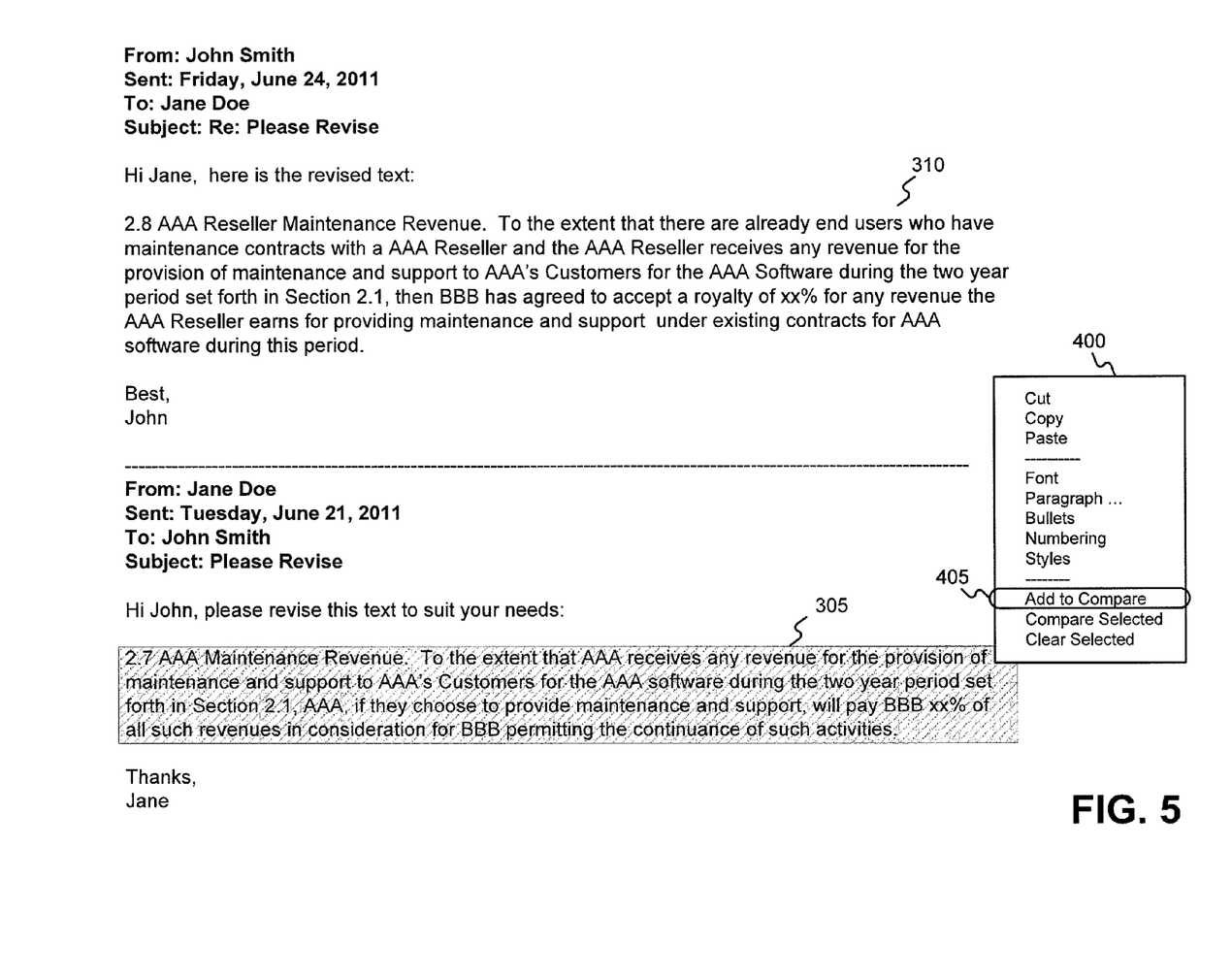

Next, the user may select original message 305 in the manner discussed above, or in any other manner used to select text. As shown in FIG. 5, the user may then right-click on the selected text, which may cause selected text comparison application 130 to display interface 400. The user may then select option 405, causing selected text comparison application 130 to create a second buffer that includes the selected text of original message 305. In this example, selected text comparison application 130 now has access to two buffers including selections of text from different locations within the same source.

Figure 6:
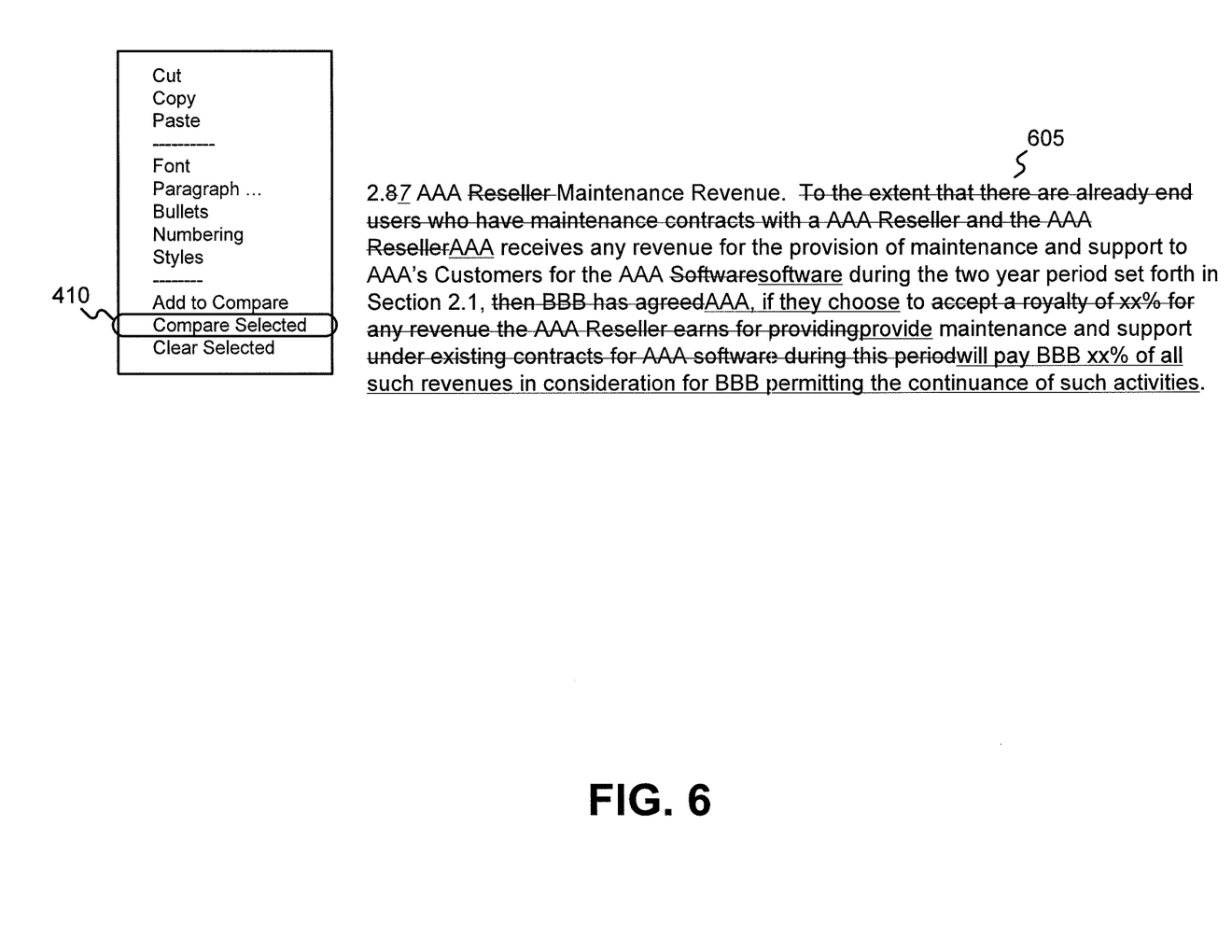
FIG. 6 is an example of a comparison output interface displaying differences between text selections, consistent with disclosed embodiments.
Figure 7:
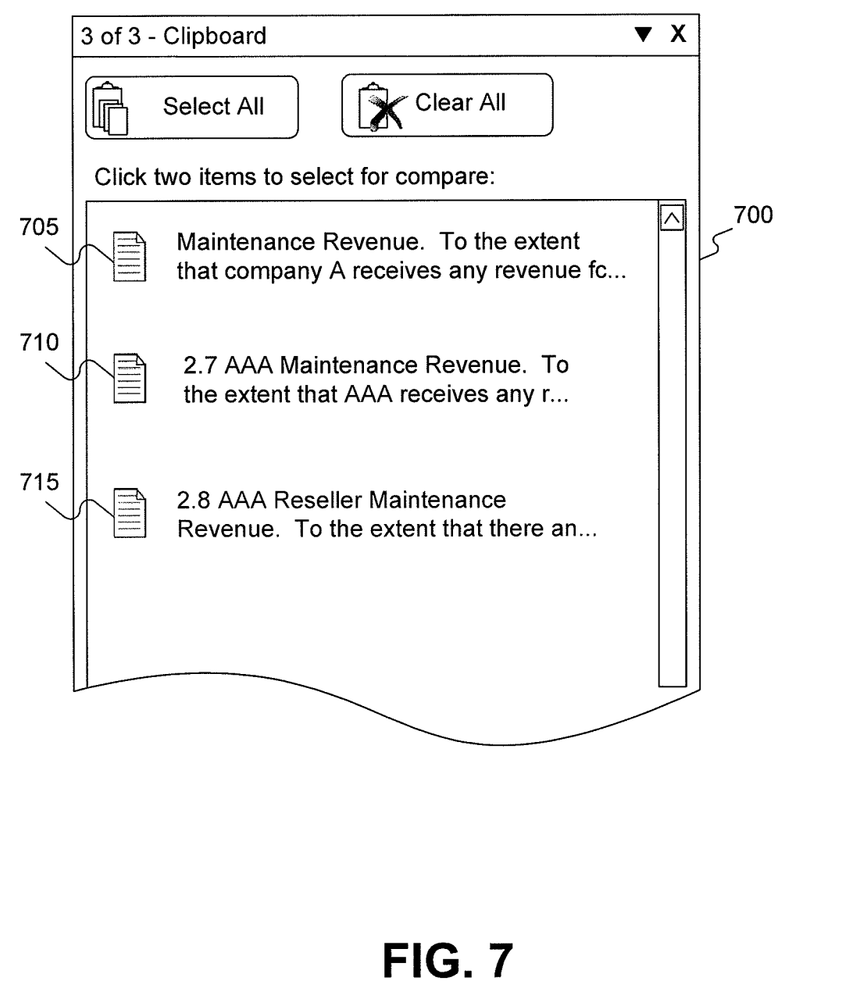
FIG. 7 is an example of an interface for selecting two buffers that contain selected text for comparison, consistent with disclosed embodiments.

The user may then initiate comparison of the two text selections. In this example, the user may do so by selecting option 410 of interface 400, as shown in FIG. 6. In some embodiments, the user may right-click on the previously selected text 305 to cause selected text comparison application 130 to display interface 400. In other embodiments, the user may request the comparison of the selected text through another interface, such as an option in a word processing document, an applet, or another interface provided by selected text comparison application 130.

Once the user indicates the selected text should be compared, selected text comparison application 130 may initiate the comparison of the contents of the first buffer and the contents of the second buffer to determine any differences. For example, the comparison may reveal that "8" has been changed to "7" and "Reseller" has been removed, as shown in FIG. 6. Selected text comparison application 130 may generate a comparison output that reflects the result of the comparison of the two buffers, shown as output 605 in FIG. 6. Selected text comparison application 130 may use any known technique for displaying differences between the contents of files.

After the user views the comparison, the user may make additional text selections from, for example, another document or a web page. When a user makes another selection, for example by using the method described above, selected text comparison application 130 may add the text selected from the document or web page to a third buffer. Selected text comparison application 130 may then allow the user to compare the selected text from the document or web page with original message 305 or reply message 310. For example, with the third buffer created, and after the user has chosen "compare selected" option 410, or otherwise indicated that selected text is to be compared, selected text comparison application 130 may display interface 700, shown in FIG. 7. Interface 700 may allow a user to select the first buffer 710 with the text of original message 305 and the third buffer 705 with text selected from the document or web page. For example, the user may click on a representation of one of the buffers, hold the control key and click on a representation of another buffer. In other embodiments, interface 700 may provide a check box, a radio button, etc., that a user may select to indicate which of the two buffers are selected. Any type of mechanism may be implemented to enable selection of one or more buffer representations. Selected text comparison application 130 may then compare the text contained in the two selected buffers and create a display of the comparison results, as described above.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in firmware. Additionally, although disclosed aspects are described as being stored in a memory on a computer, one skilled in the art will appreciate that these aspects can also be stored on other types of tangible computer-readable media, such as secondary storage devices, like hard disks, floppy disks, a CD-ROM, or other forms of RAM or ROM.

Computer programs based on the written description and disclosed methods are within the capabilities of one of ordinary skill in the art. The various programs or program modules can be created using any of the techniques known to one skilled in the art or can be designed in connection with existing software. For example, program sections or program modules can be designed in or by means of DirectX, .Net Framework, .Net Compact Framework, Visual Basic, C, XML, Java, C++, JavaScript, HTML, HTML/AJAX, or any other now known or later created programming language. One or more of such software sections or modules can be integrated into a computer system or existing browser software.

Other embodiments will be apparent to those skilled in the art from consideration of the specification and practice of the embodiments disclosed herein. The recitations in the claims are to be interpreted broadly based on the language employed in the claims and not limited to examples described in the present specification or during the prosecution of the application, which examples are to be construed non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope equivalents.

What is claimed is:

1. A computer-based text comparison system for comparing selections of text comprising:
a processor; and
a memory coupled to the processor, the memory storing instructions to direct the processor to perform operations comprising:
receiving a first selection of text from within a first file for comparison and placing the first selection of text into a first buffer,
receiving a second selection of text from within a second file different than the first file for comparison and placing the second selection of text into a second buffer,
receiving a third selection of text from within one of the first file, the second file, or a third file different than the first or second files for comparison and placing the third selection of text into a third buffer;
generating data used to display a representation of the first buffer, a representation of the second buffer, and a representation of the third buffer;
receiving an input that indicates selection of two of the three displayed representations;
comparing the content of the text placed in the buffers associated with the two selected representations; and
displaying a comparison output including differences between the content of the text placed in the buffers associated with the two selected representations.

2. The system of claim 1, wherein the data used to display the representation of the first buffer includes data reflecting a source of the first selection of text.

3. The system of claim 1, wherein at least one of the first file, the second file, or the third file is a web page or an email message.

4. The system of claim 1, wherein the second file is a different type of file than the first file.

5. The system of claim 1, wherein the comparing includes sending the text placed in the buffers associated with the two selected representations to a remote computer for comparison and receiving a result of the comparison from the remote computer.

6. The system of claim 1, wherein the first file and the second file are files of the same type.

7. The system of claim 1, the operations further comprising:
   receiving two or more inputs that indicate different selections of two of the three displayed representations, and
   comparing the buffers associated with the two selected representations of each of the two or more inputs received.

8. A computer-implemented method for comparing selections of text comprising:
   receiving a first selection of text from within a first file for comparison and placing the first selection of text into a first buffer;
   receiving a second selection of text from within a second file different than the first file for comparison and placing the second selection of text into a second buffer;
   receiving a third selection of text from within one of the first file, the second file, or a third file different than the first or second files for comparison and placing the third selection of text into a third buffer;
   generating data used to display a representation of the first buffer, a representation of the second buffer, and a representation of the third buffer:
   receiving an input that indicates selection of two of the three displayed representations;
   comparing the content of the text placed in the buffers associated with the two selected representations; and
   displaying a comparison output including differences between the content of the text placed in the buffers associated with the two selected representations.

9. The method of claim 8, wherein the data used to display the representation of the first buffer includes data reflecting a source of the first selection of text.

10. The method of claim 8, wherein at least one of the first file, the second file, or the third file is a web page or an email message.

11. The method of claim 8, wherein the second file is a different type of file than the first file.

12. The method of claim 8, wherein the comparing includes sending the text placed in the buffers associated with the two selected representations to a remote computer for comparison and receiving a result of the comparison from the remote computer.

13. The method of claim 8, wherein the first file and the second file are files of the same type.

14. The method of claim 8 further comprising:
   receiving two or more inputs that indicate different selections of two of the three displayed representations, and
   comparing the buffers associated with the two selected representations of each of the two or more inputs received.

15. A tangible non-transitory computer-readable storage medium storing instructions for comparing selections of text, the instructions causing one or more computer processors to perform operations, comprising:
   receiving a first selection of text from within a first file for comparison and placing the first selection of text into a first buffer;
   receiving a second selection of text from within a second file a different than the first file for comparison and placing the second selection of text into a second buffer;
   receiving a third selection of text from within one of the first file, the second file, or a third file different than the first or second files for comparison and placing the third selection of text into a third buffer;
   generating data used to display a representation of the first buffer, a representation of the second buffer, and a representation of the third buffer;
   receiving an input that indicates selection of two of the three displayed representations;
   comparing the content of the text placed in the buffers associated with the two selected representations; and
   displaying a comparison output including differences between the content of the text placed in the buffers associated with the two selected representations.

16. The computer-readable medium of claim 15, wherein at least one of the first file, the second file, or the third file is a web page or an email message.

17. The computer-readable medium of claim 15, wherein the second file is a different type of file than the first file.

18. The computer-readable medium of claim 15, wherein the first file and the second file are files of the same type.

19. The computer-readable medium of claim 15, the instructions causing the one or more computer processors to perform operations further comprising:
   receiving two or more inputs that indicate different selections of two of the three displayed representations, and
   comparing the buffers associated with the two selected representations of each of the two or more inputs received.

20. A system for comparing text, comprising:
   a first buffer;
   a second buffer;
   a third buffer; and
   a processor configured to:
      store in the first buffer a first set of selected text from within a first file,
      store in the second buffer a second set of selected text from within a second file different than the first file,
      store in the third buffer a third set of selected text from within one of the first file, the second file, or a third file different than the first or second files;
      generate data used to display a representation of the first buffer, a representation of the second buffer, and a representation of the third buffer;
      receive an input that indicates selection of two of the three displayed representations;
      compare the content of the text placed in the buffers associated with the two selected representations, and
      generate data representing differences between the content of the text placed in the buffers associated with the two selected representations.

* * * * *